United States Patent [19]

McEwen

[11] Patent Number: 5,291,327
[45] Date of Patent: Mar. 1, 1994

[54] IMAGING SYSTEM USING FOCAL PLANE ARRAY

[75] Inventor: Robert K. McEwen, Essex, United Kingdom

[73] Assignee: GEC-Marconi Limited, United Kingdom

[21] Appl. No.: 750,598

[22] Filed: Aug. 28, 1991

[30] Foreign Application Priority Data

Sep. 5, 1990 [GB] United Kingdom ............... 9019337

[51] Int. Cl.$^5$ ............................................. G02B 26/08
[52] U.S. Cl. ................................. 359/209; 250/235
[58] Field of Search ............................. 359/209-211, 359/889, 227, 230, 234, 236; 358/212, 213.11-213.13, 113; 250/208.1, 208.6, 332, 578.1, 234-236, 338.3

[56] References Cited

U.S. PATENT DOCUMENTS

| | | | |
|---|---|---|---|
| 3,614,194 | 10/1971 | Harris | 359/209 |
| 4,227,210 | 10/1980 | Nixon | 358/113 |
| 4,633,317 | 12/1986 | Uwira et al. | 358/213 |
| 4,634,870 | 1/1987 | Metcalf | 250/332 |
| 4,641,038 | 2/1987 | Baker | 359/209 |
| 4,982,093 | 1/1991 | Voles | 250/332 |
| 5,180,912 | 1/1993 | McEwen et al. | 250/234 |

FOREIGN PATENT DOCUMENTS

| | | |
|---|---|---|
| 0133890A2 | 6/1984 | European Pat. Off. . |
| 2152781A | 6/1982 | United Kingdom . |
| 2204210A | 4/1988 | United Kingdom . |

*Primary Examiner*—Bruce Y. Arnold
*Assistant Examiner*—James Phan
*Attorney, Agent, or Firm*—Lowe, Price, LeBlanc & Becker

[57] ABSTRACT

An imager for the implementation of microscan comprises a member 18 for interrupting radiation between a lens and an array of imaging elements 13. The member 18 comprising alternate refractive transmissive regions 25 and non-transmissive regions 24. The transmissive regions 25 refracting radiation transmitted through them in the direction shown by the arrows. As the disc rotates across the array 13 the image focused on it moves giving successive frames which are shifted relative to one another.

31 Claims, 4 Drawing Sheets

25μm

IMAGING SYSTEM USING FOCAL PLANE ARRAY

BACKGROUND OF THE INVENTION

This invention relates to an imaging system using Focal Plane Arrays (FPAs), and in particular but not exclusively to such imagers, imaging in the Infra Red (IR) wavebands.

IR imaging systems are becoming more important in many fields now, in particular military, security and search and rescue applications. Early IR imagers employed a small number of detector elements, across which was scanned an IR image of the scene via a system of mirrors and polygons. More recent developments include imagers based on 2 dimensional arrays of detector elements, so called staring arrays, which require no scanning to produce a useful image of the scene. The dwell time available for each detector element in such systems is considerably increased over earlier scanner systems resulting in significantly improved system performance being achievable from comparable detector materials. The IR system designer can choose whether to exploit this increase in performance or use a lower performance detector material to achieve a similar sensitivity as in the earlier scanner systems. High system performance is typified by imagers based on arrays of Cadmium Mercury Telluride cooled to liquid nitrogen temperatures, whilst conventional levels of performance are achieved by imagers based on Schottky barrier arrays and pyroelectric ceramics These latter systems offer significant advantages in terms of cost and or logistical support requirements (such as coolant supplies) over the high performance systems.

Unfortunately, several disadvantages of FPA imagers must be overcome to provide performance comparable with conventionally scanned imagers. Current FPAs are only available in limited pixel counts, typically 128×128 or 256×256 elements, which is insufficient to match the spatial resolution of the best scanned imager systems. Eventually, the development of suitable fabrication technologies will overcome this problem, resulting in large pixel densities.

A more fundamental problem, however, concerns the basic physics of imaging via a focal plane array. This is shown schematically in FIG. 1a, where a single row of elements from the detector array is considered. For simplicity the elements are considered square in shape, of length given by A, and are fabricated with a pitch P. The modulation transfer function (MTF) of a single element in the array is given by the modulus of the sinc function, as shown in the figure, with the first zero occurring at a spatial frequency of 1/A. Since an array of such elements is used, this MTF as shown in FIG. 1a is convolved with a series of delta-functions separated by spatial frequencies of Fs(=1/P), the sampling frequency. As shown in the figure, this results in a folding of the MTF curve into the area between 0 and Fs/2. Spatial frequencies higher than Fs/2 which are present in the image are reproduced by the array as lower, alias frequencies in the range 0 to Fs/2. For 2 dimensional arrays the effect is much worse than FIG. 1A shows, since aliasing occurs in both axes simultaneously. The effect is similar to conventional data sampling limitations, governed by Nyquist's Theorem, except that it occurs in the spatial domain rather than in the post detection electronics.

For staring systems, therefore, the MTF is limited by twice the detector pitch, and the full MTF available from the detector geometry cannot be exploited as it would in a scanning system. One technique which has been widely used to overcome this limitation is microscan, or mechanical interlace. In this technique, the image of the scene is moved across the detector array, when the device is not imaging, by a fraction of the inter element pitch, such that an integral number of steps fit into the pitch. The display of the subsequent field of data is shifted by a corresponding amount to ensure the fidelity of the reconstructed image. The effect of microscan is shown in FIG. 1b, which considers a first order microscan, in which the image is moved by 1/2P. The MTF of the individual elements remain unchanged, however the sampling frequency is multiplied by the microscan factor, in this case x2. As a result a much larger portion of the MTF can be utilised before aliasing is encountered.

Microscan therefore permits the MTF of scanning systems to be achieved in staring systems. Different orders of microscan are frequently adopted, such as 2×2 or 3×3, the numbers representing the number of steps in each axis per pixel pitch. The optimum choice of microscan order depends on the relative size of the element and sampling pitch and the effect of other factors such as the optical MTF.

FIG. 2 shows a typical imager 1 for implementation of microscan. The imager 1 comprises a lens 2 focusing radiation on to an imaging array of thermal detectors 3. Such detectors require the radiation incident on them to be modulated by a chopper 4, driven by motor 5 energised by battery 6, in order for the detection process to work. A leading edge of the chopper 4 scans across the array 3 synchronously with readout from the array by the electronic circuit 7. Radiation from the scene is incident on the detector via a mirror 8. Microscan is achieved by tilting the mirror 8 while the entire detector is covered by the chopper 4. This implementation has the following disadvantages:-

1. The microscan mechanism can be quite complex, since the mirror is ideally required to tilt in two orthogonal axes at a relatively high speed;

2. For maximum efficiency, the detector would be operated in consecutive fields, with the gaps between the chopper blades being exactly the same size as the detector itself. This would result in the entire detector being closed to radiation only for an instant. For the microscan mirror to move without degrading the image quality, this must be extended to a finite period—a blanking period—which can be a significant portion of the active field period. As a result the efficiency of the system is reduced;

3. The requirement of a fold in the optical path, for the reflective microscan to operate, limits the lowest f-number which the lens can achieve without vignetting, typically to greater than f/2.8;

4. The backworking distance of the lens must be maximised to fit the optical fold in; and 5. The entire assembly is difficult and costly to manufacture, requiring precision design and fabrication due to the large number of components competing for space close to the focal plane.

It is an object of the present invention to provide an imager which overcomes at least some of the above problems.

SUMMARY OF THE INVENTION

According to a first aspect of the present invention there is provided an imager comprising a lens, an array of sensing elements arranged in rows and columns and a member which includes at least one refractive region transmissive to radiation to which the sensing elements are responsive, wherein the member is moveable such that a refractive region of the member is repeatedly interposed in a radiation path between the lens and the array whereby the image focused on the array is displaced diagonally relative to rows and columns of the array, although this diagonal displacement may be obtained as a result of a series of steps.

By employing this aspect of the present invention, displacement of an image across the array of sensing elements is achieved by refracting the radiation prior to incidence upon the array. This eliminates the need for an optical fold required with previous mirror arrangements, thereby relaxing the backworking distance requirement of the primary optical component and permitting the use of low f-number optics without problems of vignetting being encountered. This provides a mechanical means of implementing microscan with a low cost easy to manufacture unit.

Preferably the member includes at least one region which is substantially non-transmissive to said radiation and is interposable in the radiation path, thereby the member provides both a microscanning and chopper arrangement. This is particularly advantageous when the sensor elements are of the type where a resetting period is required.

Preferably the member is a substantially planar member which is arranged to rotate about an axis and comprises a plurality of transmissive refractive regions arranged alternatively with non transmissive regions around an annulus, the dimensions of the member being such that the boundary between adjacent transmissive and non transmissive regions passes over the array with a substantially constant linear velocity. Because the boundary between adjacent transmissive and non-transmissive regions passes over the array with a substantially linear velocity, all elements of a row of the array, (or column depending on the orientation), are substantially simultaneously covered or uncovered. This enables the transmissive and non-transmissive regions to have minimum dimensions so that each row is exposed to the new microscan position as it is uncovered, without having a delay period during which the entire array would be covered, which would reduce the efficiency of the imager. Furthermore it ensures equal exposure of all elements in a row or column. The refractive regions may extend to the periphery of the member, and/or may be inwardly extensive substantially to its centre.

According to a second aspect of the present invention there is provided an imager comprising a lens, an array of sensing elements and a substantially planar member which is arranged to rotate about an axis, the member comprising a plurality of refractive regions, transmissive to radiation to which the sensing elements are responsive, and adjacent non-transmissive regions which upon rotation of the member intersect a radiation path between the lens and the sensor array, the dimensions of the member being such that the boundary between adjacent transmissive and non-transmissive regions passes over the array with a substantially linear velocity.

By employing this second aspect of the present invention microscanning is implemented by simple mechanical means, and as with the first aspect of the invention eliminates the need for an optical fold, and the problem associated therewith. The member performs both a chopper function and a refracting function which refracts the radiation prior to incidence upon the sensor array, and again, because the boundary between adjacent transmissive and non-transmissive regions passes over the array with a substantially linear velocity, all elements of a row of the array, (or column depending on the orientation), are substantially covered or uncovered giving the same advantages as those described above with reference to the first aspect of the invention.

Preferably one rotation of the member of an imager in accordance with either the first or second aspects of the present invention, or both, generates at least two sets of microscanned images upon the array of sensing elements. This requires two or more sets of transmissive and non-transmissive regions in the annular portion of the member. This correspondingly reduces the angle between adjacent boundaries by a factor of two or more so that the boundary passes over the array with a more linear velocity.

Advantageously the boundary between adjacent regions is curved. This enables the effect of radial rotation on the boundary to be compensated for so that the boundary again passes over the array with a linear velocity.

The radiation may be successively refracted and allowed to pass to the array without being refracted, but preferably the member comprises a plurality of refractive regions arranged, such that in operation movement of the member causes different transmissive regions to be interposed in turn in said radiation path whereby the image focused on the array is sequentially moved in different directions relative to the array. This eliminates the problem of defocusing sometimes arising when having an open aperture due to different path lengths being imposed between the lens and the array.

BRIEF DESCRIPTION OF THE DRAWINGS

One embodiment of the invention will now be described by way of example only with reference to the accompanying FIGS. 3 to 7 of which.

DETAILED DESCRIPTION

Figure 1A:
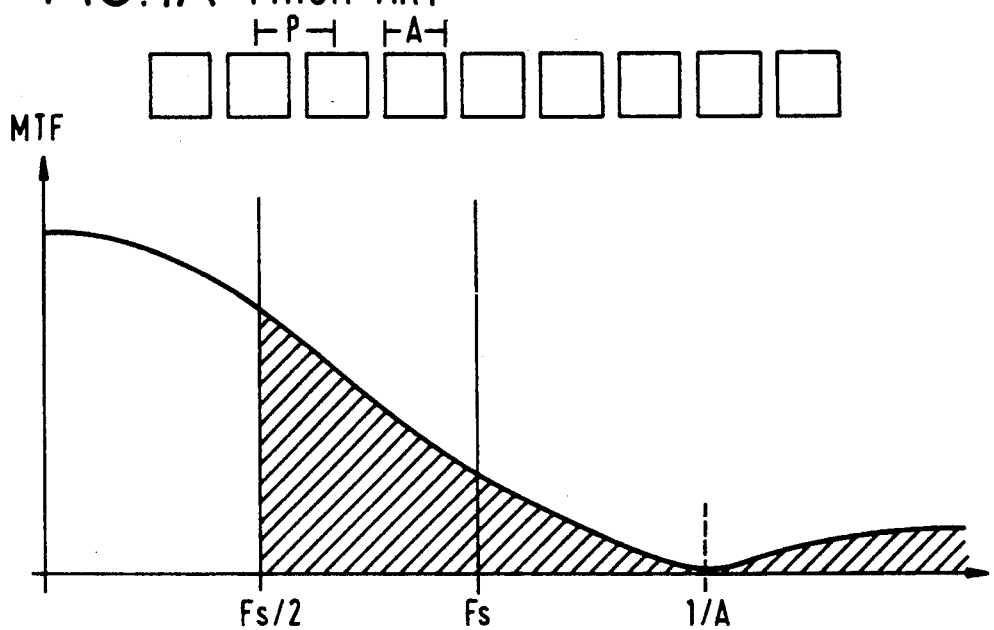
FIG. 1a is a graph depicting modular transfer frequency (MTF) versus spacial frequency ($F_s$)
Figure 1B:
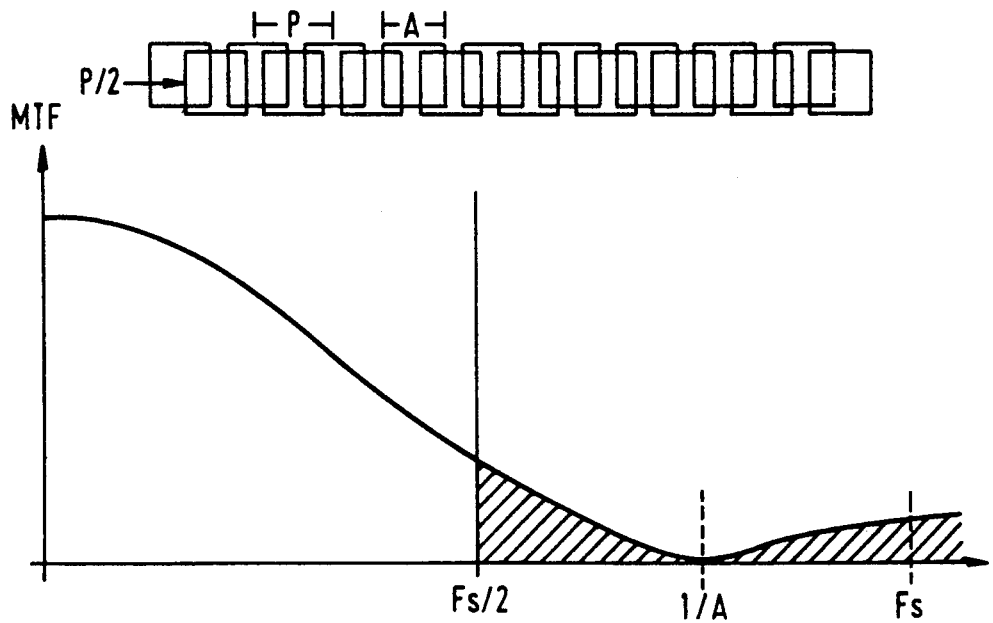
FIG. 1b is a graph similar to FIG. 1a in which the image is moved by 1/2P.
Figure 2:
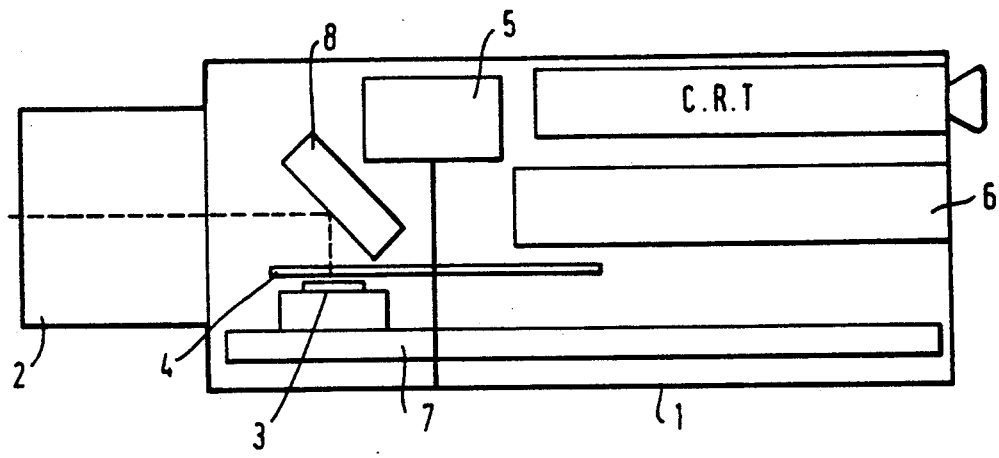
FIG. 2 is a schematic of a typical imager.
Figure 3:
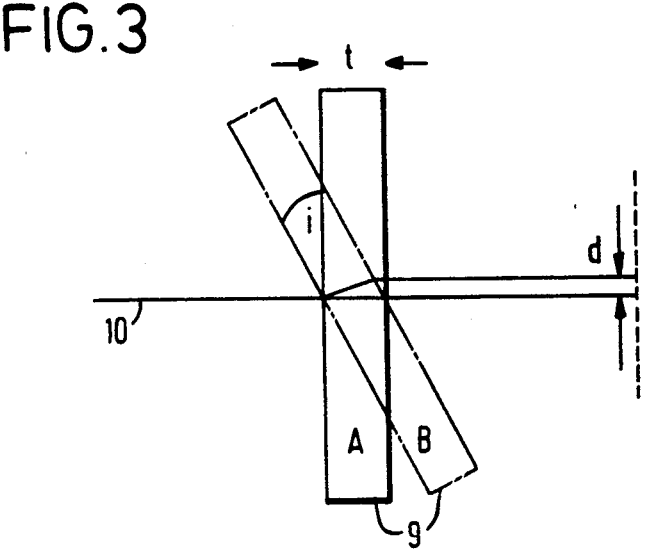
FIG. 3 shows the principle behind the operation of an imager constructed in accordance with the invention.
Figure 4:
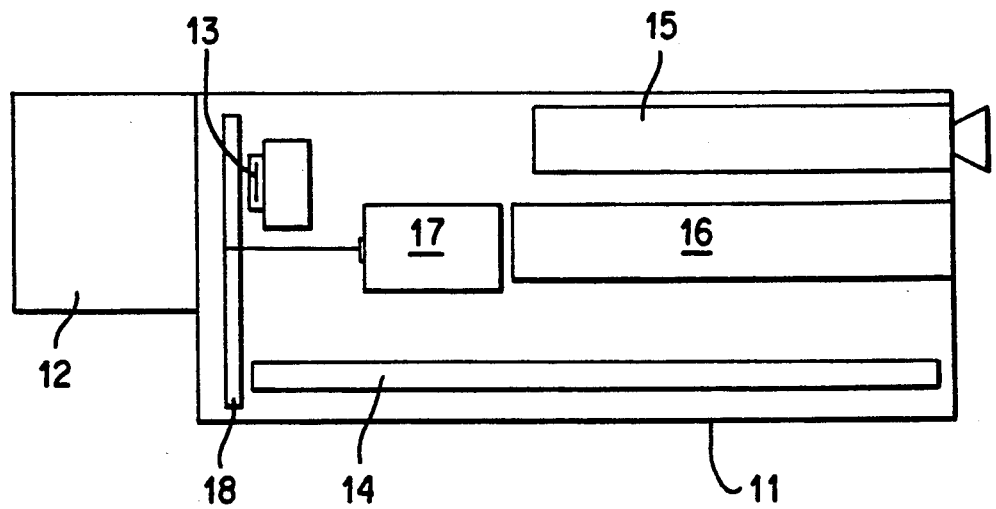
FIG. 4 schematically illustrates an imager in accordance with the invention.

Referring now to FIG. 3 there is illustrated the principle of refraction employed by the present invention. A refractive transparent block of material 9 when positioned at A, so that it is perpendicular to an optical axis 10, will transmit light straight through it. However when the material is rotated through an angle i to a position B, rays of light are refracted towards the normal of the block 9 when entering it and exit parallel to the original ray with a displacement which is a function of the refractive index, the angle of tilt, and the thickness of the material, the exact distance by which it is refracted is given by :

$$d = t \operatorname{SIN} i \left[ 1 - \frac{\cos i}{\sqrt{(n^2 - \operatorname{SIN}^2 i)}} \right]$$

where t=thickness of refractive element
i=angle of tilt of refractive element
n=refractive index of element In FIG. 4 there is illustrated an imager 11 which in accordance with the invention utilises the refraction principles illustrated in FIG. 3 to implement microscan. The imager comprises a lens 12 for focusing radiation onto a array of pyroelectric detectors 13, which are read by the electronic circuit 14. The output of the circuit energises a cathode ray tube 15 which produces an image representative of the scene viewed by the array of sensor elements 13. The cathode ray tube 15, electronic circuit 14 and sensor array 13 are supplied with electrical energy by battery 16 which also energises motor 17 rotating a chopper 18 located between the lens 12 and the sensor array 13.

Figure 5:
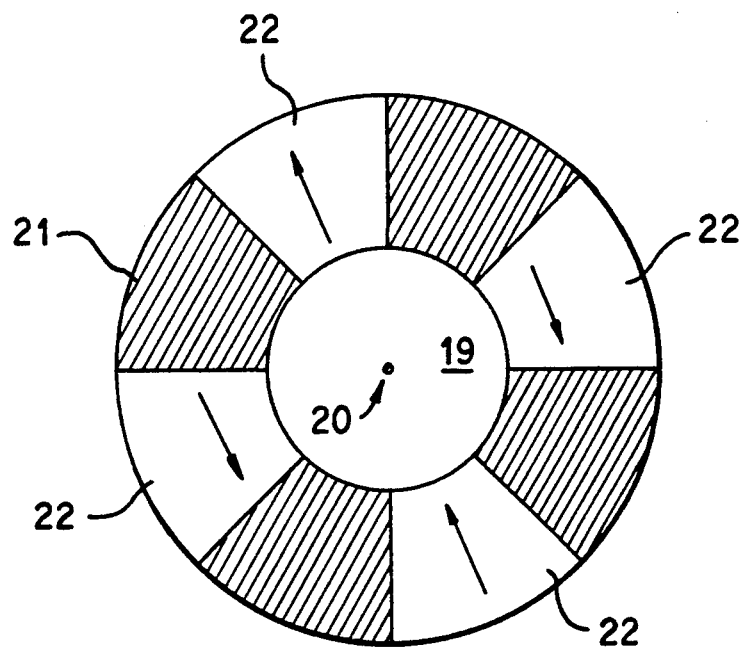
FIG. 5 illustrates a member suitable for use with the imager of FIG. 4 when in accordance with a first aspect of the invention.

One type of chopper 18 for use in the imager of FIG. 4 when in accordance with the first aspect of the invention, is illustrated in FIG. 5, and comprises a central hub 19 which rotates about the perpendicular axis 20. The hub supports four non transmissive sections 21 and four transparent refractive sections 22 of Germanium, each tilted in a different axis, as indicated by the arrows.

The sensor array 13 of FIG. 4, is read by the electronic circuit 14 in synchronism with rotation of the chopper 18, so that a blanking period resetting the pyroelectric elements 13 is obtained when each non-transmissive region 21 passes across the elements. When each transmissive section 22 passes across the detector array 13, an image is read out, the read out being made line by line as the leading edge of the non transmissive region passes over it. Each of the four images generated, corresponding to one rotation of the chopper, will be refracted in four directions thereby generating the desired microscan effect.

One limitation of the microscan chopper depicted in FIG. 5 is that the image prescribes a segment of an arc as the chopper 18 rotates. For example a 2×2 microscan chopper with a minimum of four sectors would result in the image prescribing 45° arc in each position. This reduces the achievable MTF of the system. The effect can however be reduced proportionally by increasing the number of sectors in the chopper by an integral factor, producing several microscan sequences per revolution. A suitable chopper 18 is illustrated in FIG. 6.

Figure 6:
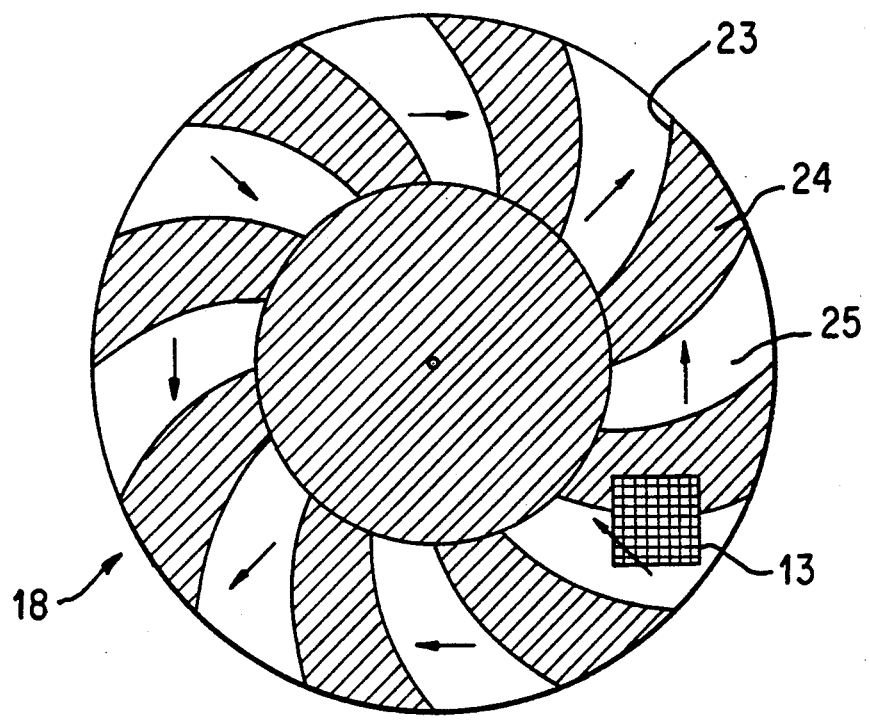
FIG. 6 depicts a member for use in the imager of FIG. 4 in accordance with first and second aspects of the invention and FIG. 7 schematically illustrates the microscan obtained by operating the imager of FIG. 4.

The chopper 18 of FIG. 6 is more suitable for use with the imager of FIG. 4 and provides an imager in accordance with first and second aspects of the invention. The interelement pitch of the FPA is $100 \times 10^{-6}$ m requiring a microscan shift of $50 \times 10^{-6}$ m between fields. The chopper has a total of 8 active sectors resulting in the generation of two 2×2 microscan frames per revolution. The chopper 18 uses a more complex geometry than that of FIG. 5, the spiral shape of the blade edges 23 ensuring a constant linear velocity of the edge across the entire detector 13, produced directly from the constant angular velocity of the motor 17.

Figure 7:
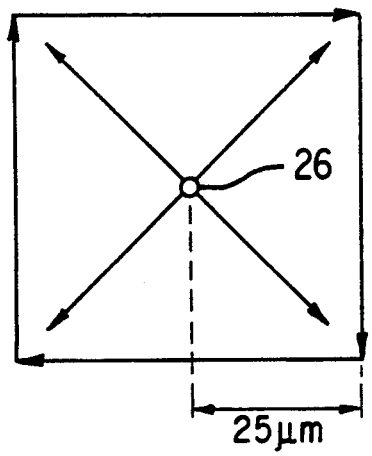

Each transparent segment 25 of the chopper 18 is made of $0.5 \times 10^{-3}$ m thick germanium optical flats, anti reflection coated for the $8\text{-}14 \times 10^{-6}$ m band. To achieve a $50 \times 10^{-6}$ m displacement between fields, the image is displaced by $35.36 \times 10^{-6}$ m ($\sqrt{2} \times 25 \times 10^{-6}$ m) from the nominal position in the direction of the arrows. The resultant displacement from a nominal position 26 is illustrated in FIG. 7, it can be seen that an image shift of $\pm 25 \times 10^{-6}$ m in each direction between fields is obtained. In the $8\text{-}14 \times 10^{-6}$ m band, germanium has a refractive index of 4, so the $35.36 \times 10^{-6}$ m displacement is achieved by tilting each germanium flat by approximately 5.4° in the directions shown by the arrows in FIG. 6.

Although in the embodiment illustrated the chopper 18 comprises a piece-part construction with the optical flats being inserted onto an accurately machined mount, it could alternatively comprise a monolithic fabrication in a refractive material, such as germanium or plastic, optionally having selected regions blanked by the application of a suitable coating. Alternatively the same effect may be achieved by having a member in accordance with the invention comprising a first refractive portion arranged parallel and overlapping a second, chopper portion, both being adapted for simultaneous rotation about a common perpendicular axis.

The invention has hereinbefore been described in relation to producing a display, on a C.R.T. or otherwise, however it will be realized that the scope of invention extends to devices where no image is displayed, but which generate data relating to the imaged scene, for example data may be generated relating to the relative coordinates in the image of specific points.

Similarly although the invention has only been described with reference to 2×2 microscan, the scope of the invention extends to any other microscan format, for example 2×3.

What we claim is:

1. An imager comprising an array of sensing elements arranged in rows and columns, a lens adapted to focus an image on said array and a member which includes at least one refractive region transmissive to radiation to which the sensing elements are responsive, wherein the member is movable such that a refractive region of the member is repeatedly interposed in a radiation path between the lens and the array whereby the image focused on the array is displaced diagonally by said member, relative to said rows and columns of the array.

2. An imager as claimed in claim 1 wherein the member comprises a plurality of said refractive regions arranged such that in operation movement of the member causes different transmissive refractive regions to be interposed in turn in said radiation path whereby the image focused on the array is sequentially displaced in different directions relative to the array.

3. An imager as claimed in claim 1 wherein the member includes at least one region which is substantially non-transmissive to said radiation and is interposable in the radiation path.

4. An imager as claimed in claim 3, wherein the member is a substantially planar member which is arranged to rotate about an axis and comprises a plurality of transmissive refractive regions around an annulus.

5. An imager as claimed in claim 4, wherein one revolution of the member generates at least two sets of microscanned images upon the array of sensing elements.

6. An imager as claimed in claim 4, wherein a boundary between adjacent regions of the member which passes through the radiation path is curved.

7. An imager as claimed in claim 4, wherein the member is adapted to rotate about an axis at a constant angular velocity.

8. An imager as claimed in claim 4, wherein said member comprises a plurality of transmissive refractive regions which in operation successively refract the radiation path in different directions.

9. An imager as claimed in claim 8, wherein the radiation is sequentially refracted tin four orthogonal directions.

10. An imager as claimed in claim 4, wherein the member comprises four transmissive refractive regions interposed between four non-transmissive regions, each of the refractive regions being orientated to refract in the same direction relative to the member such that when the member is rotated each refractive region successively interposed in the radiation path refracts radiation to displace the image in a direction at 90° to the direction in which it was displaced by the preceding refractive region.

11. An imager as claimed in claim 1, wherein said member comprises an integral multiple of four transmissive refractive regions interposed between a corresponding number of non-transmissive regions, the orientation of each refractive region being such that when the member is rotated each refractive region successively interposed in the radiation path refracts radiation to displace the image at an angle of 90° to the direction in which it was displaced by the preceding refractive region.

12. An imager as claimed in claim 4 wherein the member has dimensions such that the boundary between adjacent transmissive and non-transmissive regions passes over the array with a substantially constant linear velocity.

13. An imager as claimed in claim 1, wherein the member includes transmissive and non-transmissive regions which have substantially identical dimensions.

14. An imager as claimed in claim 1, wherein the refractive region refracts radiation such that an image focused on the sensing elements by the lens is refracted by a distance less than the distance between centers of adjacent sensing elements.

15. An imager as claimed in claim 1, further comprising a motor for driving the member in synchronism with the readout of the sensing elements.

16. An imager as claimed in claim 1, wherein the sensing elements are pyroelectric elements.

17. An imager as claimed in claim 1 wherein the member comprises multiple series of refractive regions such that corresponding multiple cycles of refractions of the image to different positions, on the sensor array are obtained per revolution of the member.

18. An imager comprising a lens, an array of sensing elements and a substantially planar member which is arranged to rotate about an axis, the member comprising a plurality of refractive regions, transmissive to radiation to which the sensing elements are responsive, and adjacent non-transmissive regions which upon rotation of the member intersect a radiation path between the lens and the sensor array, the dimensions of the member being such that the boundary between adjacent transmissive and non-transmissive regions passes over at least one column or at least one row, of the array with a substantially constant linear velocity.

19. An imager as claimed in claim 18, wherein an image focused on the array is displaced by the member diagonally relative to rows and columns of the array.

20. An imager as claimed in claim 18, wherein one revolution of the member generates at least two sets of microscanned images upon the array of sensing elements.

21. An imager as claimed in claim 18, wherein a boundary between adjacent regions of the member which passes through the radiation path is curved.

22. An imager as claimed in claim 18, wherein the member includes transmissive and non-transmissive regions which have substantially identical dimensions.

23. An imager as claimed in claim 18, wherein the member is adapted to rotate about an axis at a constant angular velocity.

24. An imager as claimed in claim 18, wherein said member comprises a plurality of transmissive refractive regions which in operation successively refract the radiation path in different directions.

25. An imager as claimed in claim 18, wherein the refractive region refracts radiation such that an image focused on the sensing elements by the lens is refracted by a distance less than the distance between centres of adjacent sensing elements.

26. An imager as claimed in claim 18, further comprising a motor for driving the member in synchronism with the readout of the sensing elements.

27. An imager as claimed in claim 18, wherein the sensing elements are pyroelectric elements.

28. An imager as claimed in claim 18, wherein the radiation is sequentially refracted in four orthogonal directions.

29. An imager as claimed in claim 18, wherein the member comprises four transmissive refractive regions interposed between four non-transmissive regions, each of the refractive regions being orientated to refract in the same direction relative to the member such that when the member is rotated each refractive region successively interposed in the radiation path refracts radiation to displace the image in a direction at 90° to the direction in which it was displaced by the preceding refractive region.

30. An imager as claimed in claim 18, wherein said member comprises an integral multiple of four transmissive refractive regions interposed between a corresponding number of non-transmissive regions, the orientation of each refractive region being such that when the member is rotated each refractive region successively interposed in the radiation path refracts radiation to displace the image at an angle of 90° to the direction in which it was displaced by the preceding refractive region.

31. An imager as claimed in claim 18 wherein the member comprises multiple series of refractive regions such that corresponding multiple cycles of refractions of the image to different positions, on the sensor array are obtained per revolution of the member.

* * * * *